(12) United States Patent
Bright et al.

(10) Patent No.: US 8,591,332 B1
(45) Date of Patent: Nov. 26, 2013

(54) VIDEO GAME VIDEO EDITOR

(75) Inventors: Brian Bright, Los Angeles, CA (US);
Gavin Pugh, Van Nuys, CA (US);
Stuart Scandrett, Canoga Park, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 1357 days.

(21) Appl. No.: 12/115,469

(22) Filed: May 5, 2008

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ............... 463/35; 463/31; 273/460; 358/403; 709/203; 709/204; 709/217

(58) Field of Classification Search
USPC ...................... 463/31, 35; 273/434–437, 460; 358/403; 709/203, 204, 217
See application file for complete search history.

(56) References Cited

U.S. PATENT DOCUMENTS

| 4,342,454 | A | * | 8/1982 | Baer et al. ...................... 463/31 |
| 5,553,864 | A | * | 9/1996 | Sitrick ............................. 463/31 |
| 5,664,216 | A | * | 9/1997 | Blumenau ..................... 715/234 |
| 5,680,533 | A | * | 10/1997 | Yamato et al. ................ 345/473 |
| 6,667,741 | B1 | * | 12/2003 | Kataoka et al. ............... 345/426 |
| 6,699,127 | B1 | * | 3/2004 | Lobb et al. ...................... 463/43 |
| 7,769,819 | B2 | * | 8/2010 | Lerman et al. ................ 709/217 |
| 2003/0164845 | A1 | * | 9/2003 | Fayan et al. .................... 345/722 |

* cited by examiner

*Primary Examiner* — Omkar Deodhar
*Assistant Examiner* — Adetokunbo O Torimiro
(74) *Attorney, Agent, or Firm* — Klein, O'Neill & Singh, LLP

(57) ABSTRACT

A video editor for a video game is discussed. The video editor manipulates information of video game play to provide videos of game play and in some embodiments scoring of videos.

25 Claims, 14 Drawing Sheets

VIDEO GAME VIDEO EDITOR

BACKGROUND OF THE INVENTION

The present invention relates generally to video games, and more particularly to a video game including video creation capacity.

Video games create virtual worlds where people can simulate situations and experiences they may not otherwise be able to experience. Video games are enjoyed by many people, providing entertainment, excitement, and sometimes even learning experiences for video game players. Video game players perform simulated actions by operating different types of user-controlled interfaces, such as game controllers, other simulation input devices, or other modes of simulated input. User inputs generally dictate the flow and results of the video game, allowing the users to engage in a variety of virtual interactive visual and audio experiences. The virtual experiences may be based on real-life situations or may be entirely fanciful, and users may control simulated characters capable of performing tasks and engaging in scenarios ranging from near life-like to complete fantasy.

Video games may try to mimic reality, at least to an extent. For example, video games may present situations and scenarios which may only be experienced by a few, for example, sporting event stars or participants. Many video games provide users with somewhat realistic situations, but which may be performed with actions that are simpler to execute in the virtual world. These video games may provide a user with some aspects of control of movement of a simulated character in certain circumstances, for example, skateboarding.

In many instances, video game players may try to mimic real people they see on television. These real-life stars often create video clips and reels with highlights showcasing their unique skills or talents. While video games provide a means by which to simulate these skills and talents, video game users have had no medium to share their simulated highlights in a comparable fashion.

SUMMARY OF THE INVENTION

The invention provides a video editor to showcase game play clips created during video game simulation. In one aspect, the invention provides a method of providing audiovisual features for a video game, comprising receiving information for a set of video clips, each video clip corresponding to a series of images generated during game play; generating a video compilation using selected video clips from the set of video clips; modifying the video compilation based on inputs from a video game controller; and associating at least some audio with the video compilation to thereby form an audiovisual presentation. In another aspect the invention provides a system for providing a video editor in a video game, comprising a display; a video game controller; memory, the memory including a set of video clips comprising information of a skateboard character in operation of a skateboard in a simulated world; and a processor configured by program instructions to generate display information of the video editor, the program instructions including instructions for providing video clip editing options, including an option to generate an audiovisual presentation using selected video clips from the set of video clips; providing video effects editing options; providing video overlay editing options; and providing music editing options.

These and other aspects are more fully comprehended upon review of this disclosure.

DETAILED DESCRIPTION

Figure 1:
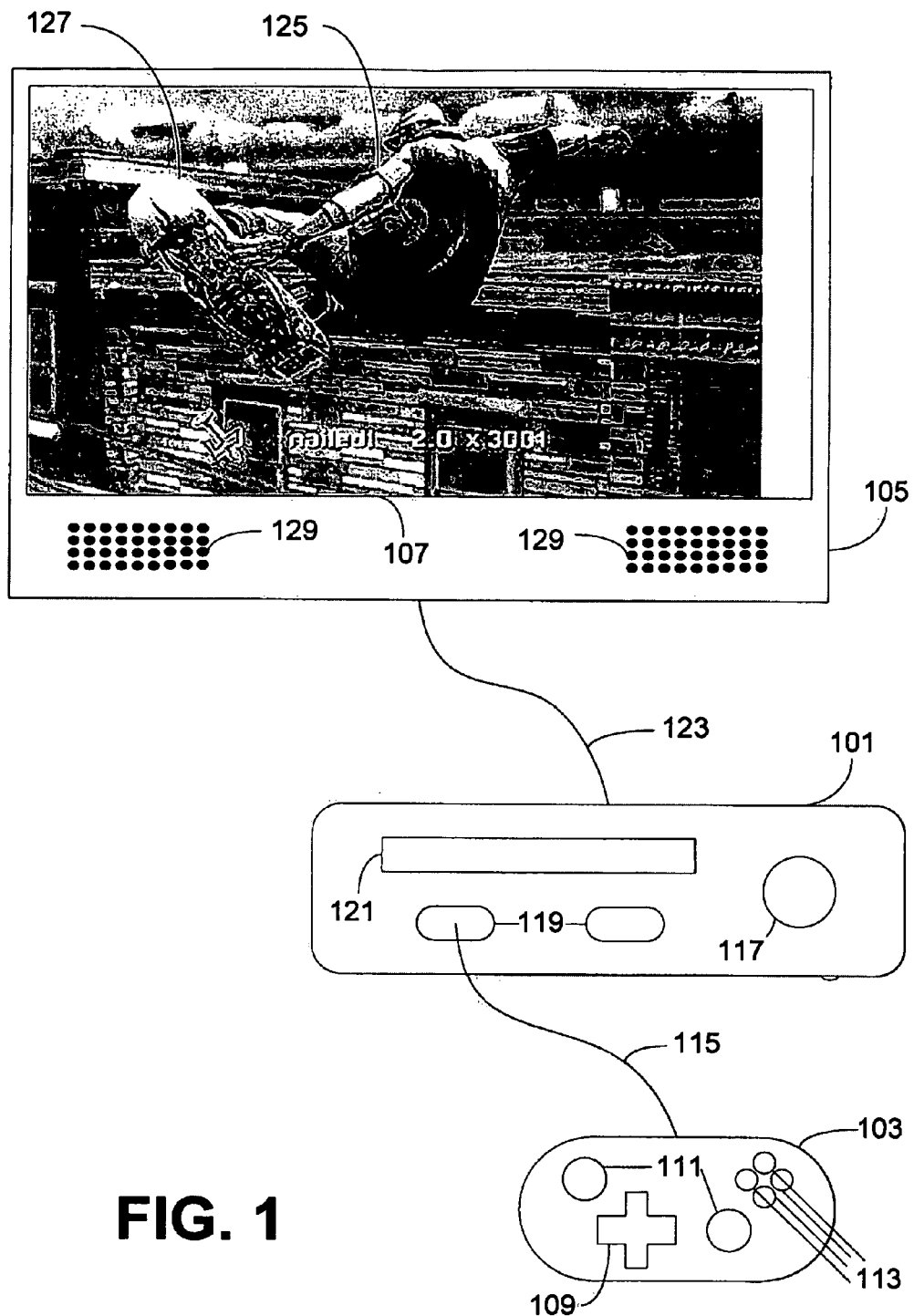
FIG. 1 is an example of a video game system in accordance with aspects of the invention.

FIG. 1 is an example of a video game system in accordance with aspects of the invention. The system includes a video game console 101. The video game console includes circuitry for performing video game and video game related functions, with the circuitry in most embodiments including one or more processors and associated memory and interface circuitry. The video game console has a power button 117, one or more video game controller interfaces 119, and an external memory interface 121. The external memory interface is configured to communicate with an external memory source, such as, for example, a video game CD-ROM.

The video game console is coupled to a display unit 105 via a cable 123. As illustrated, the display unit is a television with a display screen 107 and audio speakers 129. The display screen shows a screenshot of a video clip of video game play, with audio also being provided by the audio speakers in most embodiments. The video clip is part of a video feature, with the feature being an audiovisual feature if audio is also provided. The screenshot shows a skateboarder 125 on a skateboard 127 from a skateboarding video game. Although the screenshot is of a video clip from a skateboarding video game, in various embodiments the video clips may be from other genres of video games. The audiovisual feature may sometimes be merely termed a video in common parlance, similar to usage of the term with respect to music videos or other videos.

The video game console is also coupled to a video game controller 103. As illustrated, the video game controller is coupled to the video game console by a cable 115, although in some embodiments wireless connections may be used. In some embodiments, such as is shown in FIG. 1, the video game controller includes a digital directional pad 109, one or more multi-axis analog control sticks 111, and one or more digital input buttons 113. In other embodiments, more or less of each type of input mechanism, as well as alternative input types, may be present on the video game controller.

During video game play, the video game controller, generally operated by a user, provides inputs to the video game console. The video game console determines video game states based on the user inputs in accordance with video game program instructions and provides video and audio signals to the display unit for presenting video game states to the user. Video game states are generally determined repeatedly during game play, usually within very short time periods, with the video game states providing video game action over time.

The video game console also processes video game controller inputs in accordance with video editing program instructions to generate audiovisual presentations based on information generated during game play. A user using the video game controller may control the generation and editing aspects of an audiovisual presentation, for example, a highlight video of a simulated skateboard character, by pressing or otherwise manipulating the video game controller's inputs.

For example, during video editing, the video game console reads program instructions from internal memory or the external memory source, and processes the program instructions, which may facilitate the running of a video editor, for example for a simulated skateboarding game. A processor of the video game console may process these program instructions, along with the user input signals from the video game controllers, and generate display data and audio data based on the program instructions and the video game controller input signals. The video game console provides the display and audio data to the video display with audio capabilities through the audio/video connection 123 from the video game console.

Figure 2:
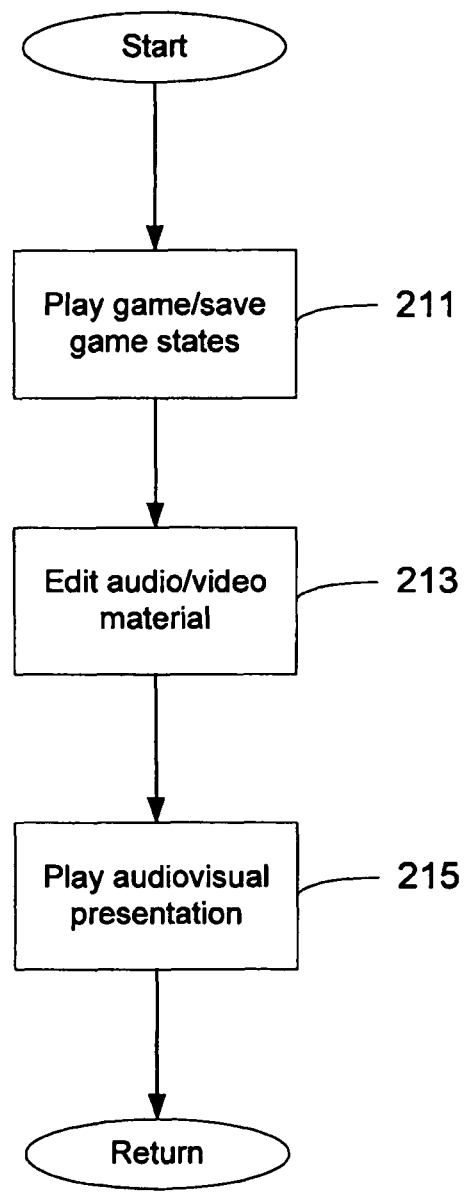
FIG. 2 is a flow diagram of a process of game play and audiovisual presentation creation in accordance with aspects of the invention.

FIG. 2 is a flow diagram of a process relating to game play and audiovisual presentation creation in accordance with aspects of the invention. The process may be performed by a video game console or a processor configured to execute program instructions. In block 211, the process performs game play and video clip information retention functions. During regular game play, the video game console may process game play events, for example, the execution of a skateboarding video game. In addition, during regular game play, the processor of the video game console saves video display information to the memory of the video game console. The video display information may be used for video editing or video playback at a later time. In some embodiments, a certain duration of video display information is saved upon request and stored in the video game console's memory for later access, for example, the most recent 30 seconds or 1 minute of video display information. In many embodiments, game state information used in generation of the video display information may be saved in lieu of the display information itself.

In block 213 the process performs video editing functions. In many embodiments the process arranges video clip information in a sequential manner, modifies video clip information, and possibly associates audio information with the video clip information. In some embodiments, the process provides a video interface for displaying editing functions and editing information, including displaying video clip information of a video game. In some embodiments, the process may command video display of video clips available for editing, for example, video clips based on saved game states. In some embodiments, the process may make available to a user audio material thereby enabling the creation of audiovisual presentation with, for example, varying background music. The audiovisual presentation, generally arranged and/or modified in accordance with user inputs provided by way of a game controller, is stored in the memory of the video game console for later retrieval or video playback.

In block 215 the process performs playback functions. The playback functions generally include display of the audiovisual presentation, including audio generation in most embodiments. The process may retrieve a particular audiovisual presentation from the memory of the video game console, and the presentation may be provided to a display unit with associated audio capability for audiovisual playback. The process may also provide options to navigate through the audiovisual presentation, including, for example, fast forward and rewind features and play, pause, and stop features. In some embodiments, other playback options may be available as well, for example, toggle features and virtual camera angles or zoom adjustments. After playback is ended, the process returns.

Figure 3:
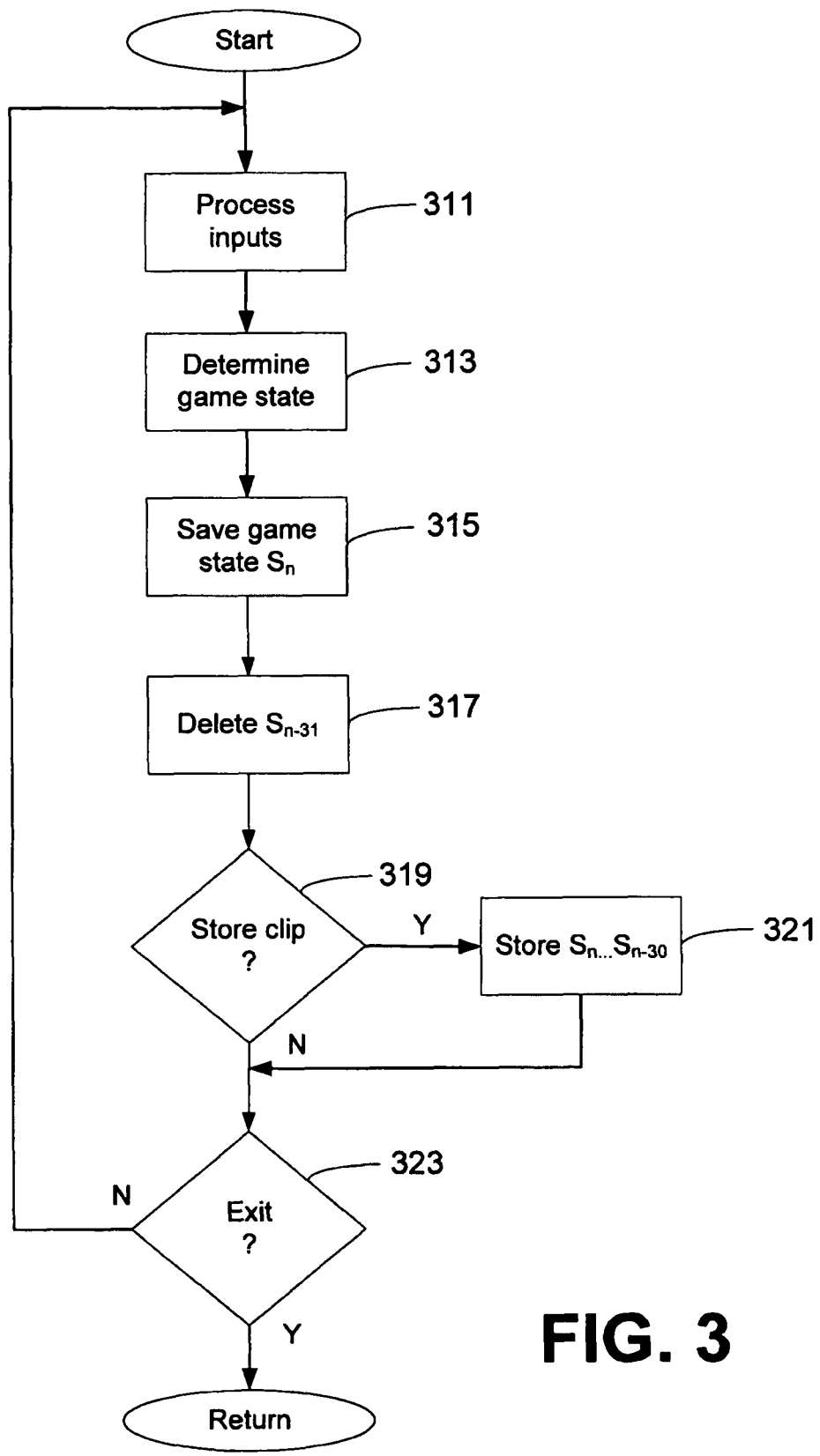
FIG. 3 is a flow diagram of one embodiment of a process of saving game play display information in accordance with aspects of the invention.

FIG. 3 is a flow diagram of one embodiment of a process of saving game play display information in accordance with aspects of the invention. In some embodiments the process is performed by a video game console, for example as discussed with respect to FIG. 1, or a processor configured by program instructions, for example. In block 311, the process processes inputs relating to game play. The process may be performed by a processor of a video game console and the inputs may be provided from a video game controller. In some embodiments, processing of user inputs is performed in accordance with processing of instructions from an external memory source, for example, a CD-ROM holding video game program instructions. Video game processing and corresponding display and audio information is determined based on inputs from the video game controller, and may also depend on additional information received from the external memory source.

In block 313, the process determines a current game state of the video game. In the context of a skateboarding game, for example, the process may determine the position of a skateboarder and a skateboard with respect to each other and with respect to a virtual world and items and objects within that virtual world. In some embodiments the skateboarder and skateboard may be considered part of a virtual world, and the process may save information of the virtual world, including position of the skateboarder and skateboard in the virtual world and possibly other aspects of the virtual world. In addition, the process may save an identifier identifying the virtual world, with for example multiple virtual worlds being available in some embodiments.

In block 315, the process saves the current game state $S_n$, where n represents a time index. The game state information stored by the process may include information sufficient to reconstruct game play display at time n. The process may store the game state in the main memory of the video game console, or alternatively in a cache or temporary memory if available.

In block 317 the process deletes saved game state $S_{n-31}$. Thus blocks 315 and 317, if performed iteratively, such as by being repeated or performed as part of a loop, save a sliding window of game states over a period of time. The number of saved game states may be, for example as shown in FIG. 3, the last 30 game states, or instead a sufficient number of game states to be able to recreate 30 seconds of game play displays, or some other number of game states.

In block 319, the process determines whether to retain the saved game states for video editing purposes. In some embodiments, a user may select an option during regular game play, for example, a record option, using inputs from the video game controller corresponding to a request to store a clip of game play footage. In some other embodiments, the processor may automatically store game states corresponding to a predefined duration of game play states on a periodic basis. In yet other embodiments, the processor may be configured to store game states corresponding to a predefined duration of game states whenever a milestone or achievement is accomplished during regular game play. For example, in the context of a skateboarding video game, recent game states may be automatically saved if, for example, a particularly difficult trick is successfully completed, or for example a high score is reached during regular game play.

If saved game states are to be retained or stored for video editing purposes, the process proceeds to block 321, otherwise the process goes to block 323. In block 321, the process retains the saved game states for video editing purposes. As discussed above, the saved game states may correspond to a predefined duration of recent game play activity, for example, the most recent 30 seconds of game play activity. In some embodiments, saved game states are moved from a temporary memory to permanent memory for storage. The game states generally include information sufficient to reconstruct game play displays for a predefined period of time, for example, for 30 seconds of game play, and the stored game state information, or displays based on the information, may be considered a video clip. The process thereafter proceeds to block 323, although it should be recognized that in various embodiments operations of block 321 may be performed as a separate process, roughly in parallel with operations of the rest of the process of FIG. 3.

In block 323 the process determines if the process should exit and return, for example at the end of game play or to perform some other process. If the process does not exit then the process returns to block 311 to further process inputs.

Figure 4:
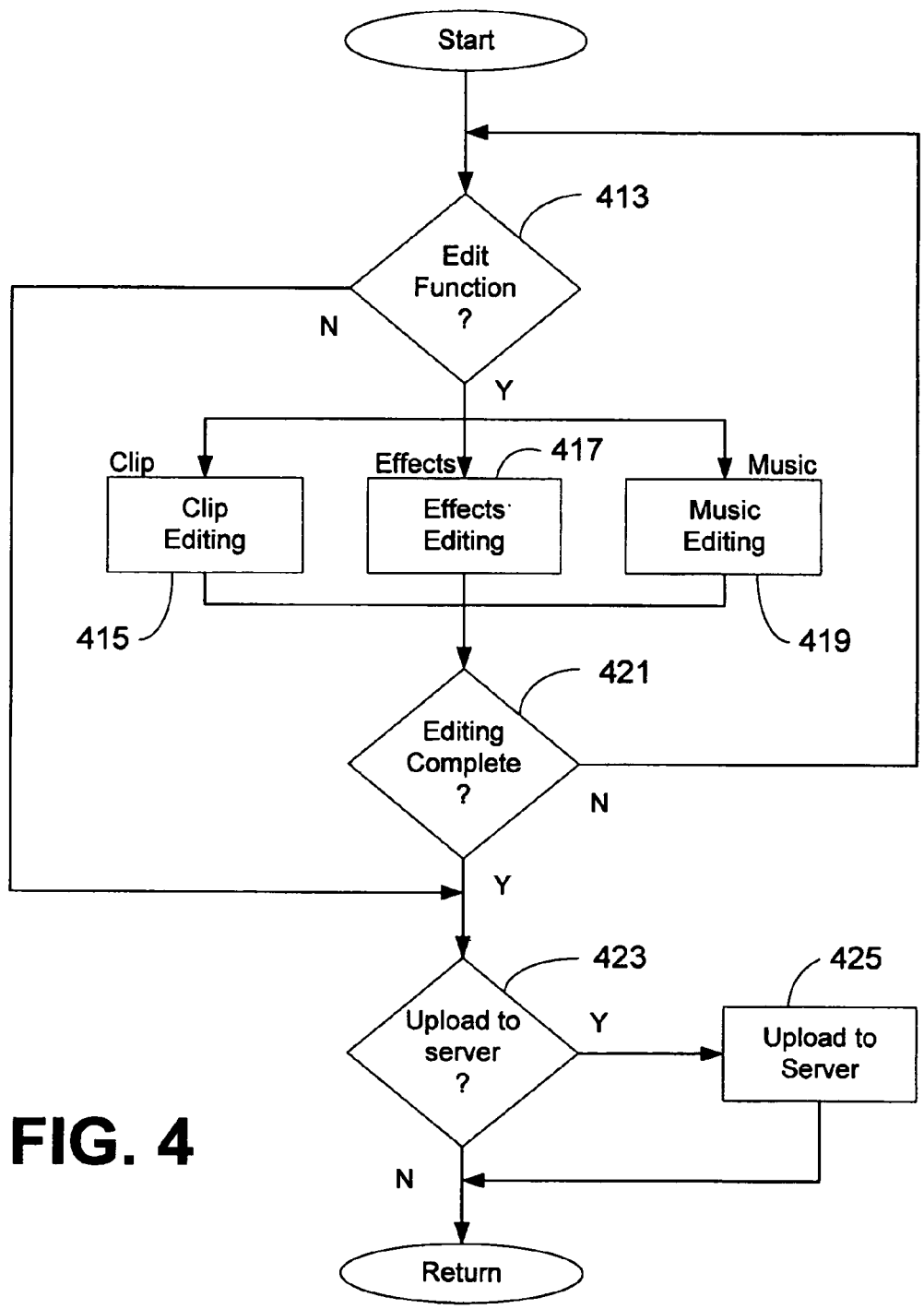
FIG. 4 is a flow diagram of a video editing process in accordance with aspects of the invention.

FIG. 4 is a flow diagram of a process of a video editor in accordance with aspects of the invention. In some embodiments the process of FIG. 4 is performed by a video game system, for example as described with respect to FIG. 1. In particular embodiments, the process is performed in the context of a video game in which a user is allowed to save game play video, either directly or by way of saving game state information, and to edit the game play video into an audiovisual presentation, which may be considered in some embodiments as a highlight video.

In block 413, the process determines an edit function. As illustrated in FIG. 4, the edit functions may be a clip edit function, an effects edit function, or a music edit function. In most embodiments the process receives an input from a game controller, for example, operated by a user, with the input indicating selection of an edit function. Users may choose to edit their video clips and game play footage, or to leave the footage as is and exit the system. In many embodiments a no edit function is also available, in which case the process may proceed to block 423, where the processor presents the option of uploading the videos to a server, for example for other users to view. In other embodiments, the process may simply return in the event of a no edit function.

The process proceeds to block 415 if the editing function is clip editing, to block 417 if the editing function is effects editing, and to block 419 if the editing function is music editing. In other embodiments, however, there may be more or less than three editing types available in the video editor.

In block 415, the process provides video clip editing options. During clip editing, the process receives inputs directed towards editing available video clips. Editing options may include, for example, rearrangement in order of time presentation of video clips, copying of portions of or entire video clips, and deletion of portions or entire video clips. The process may also modify video clips by, for example, changing the speed of playback of the video clips, for example, speeding up certain parts of the video clips and displaying other portions of selected video clips in slow motion. In addition, the process may provide for changes in camera position, camera states, or camera properties. For example, in some embodiments the process may, generally as commanded by a user, move the camera about an object, such as a skateboarder in a skateboard video game, providing a follow-focus type feature, or otherwise panning around or moving about the skateboarder. Also, for example, the process may move the camera through the virtual world, providing a camera fly over feature. Moreover, the process may also allow for camera zoom or change of camera field of view, with or without camera movement, providing for a rack focus feature or merely provide field of view, zoom, or magnification properties. In addition, in some embodiments the process may instead or addition provide for selection and use of cameras with different properties or different types of camera mounts. In this fashion, a selected video clip may be edited to provide views of different objects and from a variety of different angles and perspectives.

In block 417, the process provides effects editing options. In some embodiments, effects editing includes options to edit camera effects within the audiovisual feature, as well as options to edit camera overlays within the audiovisual feature. In other embodiments, effects editing and overlay editing may be characterized separately. Camera effects may include effects such as fish-eye lenses, blurring effects, contrast adjustments, lens color staining, and different types of camera fade effects. In some embodiments, more or less camera effects may be available for application to highlight videos. In some embodiments, the processor may also provide an option to adjust the strength of the applied effects, as well as different types of camera fade-in and fade-out options.

The effects process of block 417 may also include overlay editing options. Overlay options available to the user may include film noise, film grain, and different effects to distress the image, giving a video clip more of an amateur or realistic nature. Other overlay options may include borders around the video clips or sponsor logos.

In block 419, the process provides music editing options. In some embodiments, a variety of editing options may be available for application to the background music used in the audiovisual feature. In other embodiments, only one continuously running music file may be used for each audiovisual feature. The music editing interface may include a selection of available music files to choose from, or in some embodiments, may provide for uploading over a network such as the Internet of music files from third party servers into the system to be used with the audiovisual features. In some embodiments, preloaded music files may be beatmapped, for example so that a processor configured by program instructions may recognize when tricks shown in video clips are in synchrony with beats of the background music being played. In certain embodiments, such compiled information may be used, for example, in generating scores for highlight videos which reward points for melding and intermeshing video footage with the background music in a harmonious or synchronous fashion.

Generally, in the embodiment of FIG. 4, the process in block 421 determines whether to perform a further editing function or to exit video editing. If further editing is to be performed, the process returns to block 413. Otherwise the process proceeds to block 423.

In block 423, the process receives user inputs and determines whether to upload the video onto a server connected to the Internet, for example so that other users may be able to view and/or rate the video. In some embodiments, videos may be scored based on various criteria. The videos with the highest scores may be showcased on a server dedicated to storing similar videos for other users of the game to view, or alternatively be uploaded over the Internet to a server for anybody to access. If the process skips the upload procedure, the process returns, and will either cycle back to the beginning of the video editing process, or back to the main menu of the game, where the user may be able to select from other game play options. If the processor is directed to upload the video, the process proceeds to block 425, where the video is uploaded to a server over an Internet connection, before the process returns.

Figure 5:
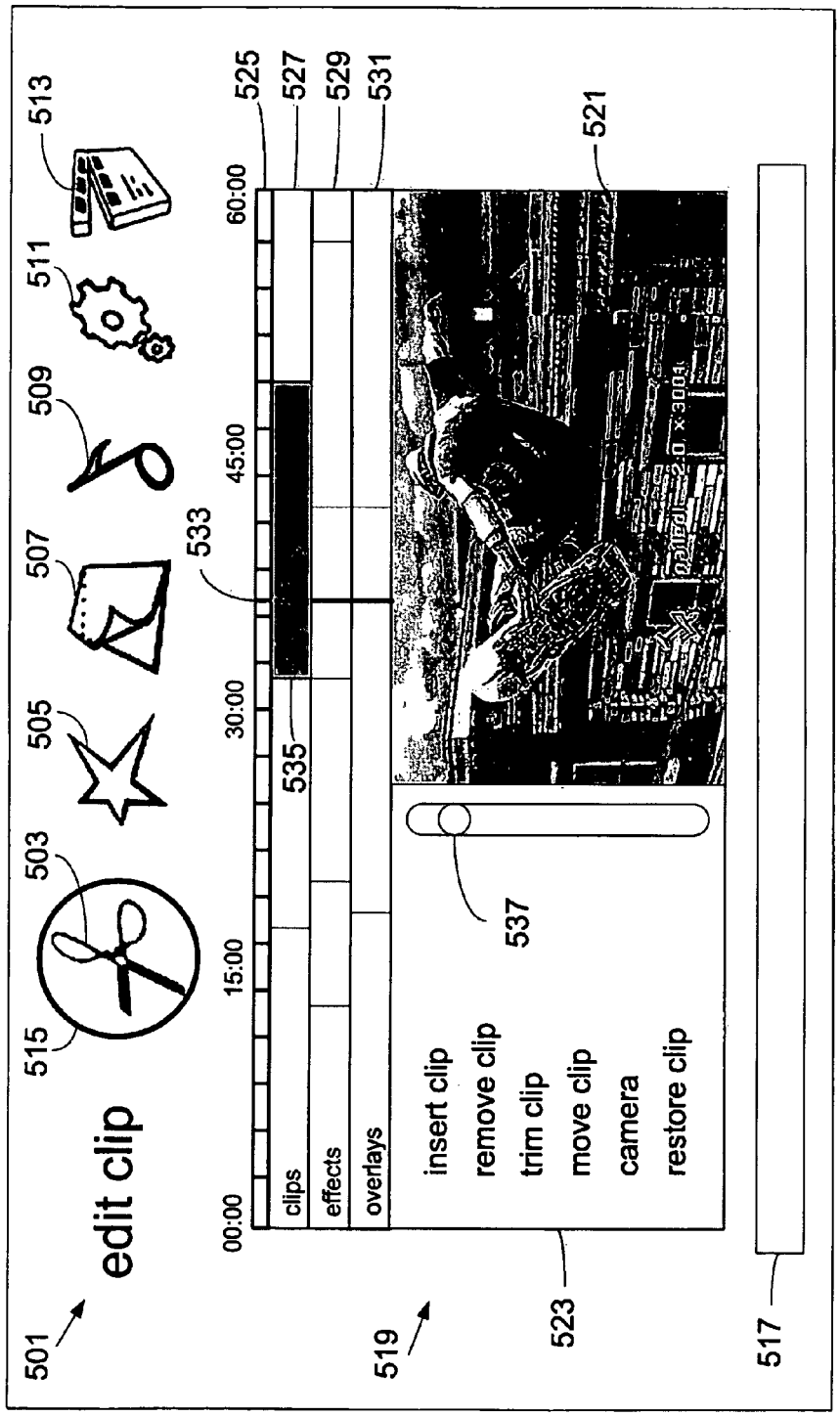
FIG. 5 is a screenshot of a video clip editing screen in accordance with aspects of the invention.

FIG. 5 is a screenshot of a video editing screen in accordance with aspects of the invention. In the embodiment illustrated in FIG. 5, the video editing screen provides video clip editing features. In some embodiments, the video editing screen may be provided as part of block 415 of the process of FIG. 4. As illustrated, an "edit clip" label 501 appears at the top left of the screen. Also along the top of the screen is a clip editing icon 503, an effects editing icon 505, an overlay editing icon 507, a music editing icon 509, an options icon 511, and a play/upload icon 513. In FIG. 5 the edit clip icon is circled 515, indicating that the video clip editing function is active. Selection of other icons result in other functions being made available.

In some embodiments, additional markers may be utilized to indicate which editing features are active, for example, highlighting or enlarging the icon representing active editing features. The active editing features of the video editor can be changed through specific user inputs on a video game controller, for example, depression of a multi-axis analog control stick. The exact user input or sequence of user inputs on the video game controller required to change the active editing features may be indicated in the input legend or key 517, located at the bottom of the video editor. The input legend displays information on the different tasks the various user inputs on the video game controller perform when depressed or displaced.

The video editing screen also includes a main editing interface 519, comprising a preview screen, or viewport 521, which displays a currently selected video clip, a multi-purpose command list 523, which lists different editing options and sub-options which may be used in editing of the video clip, and a plurality of timelines corresponding to the runtime of the video being created. The timelines may include, for example, a time reference index 525, a clips timeline 527, an effects timeline 529, and an overlays timeline 531. Each of the timelines display blocks corresponding to features being applied to the highlight video at a particular time in the video. For example, each block in the clips timeline may represent a different clip being shown during a particular segment of the highlight video. Similarly, each block in the overlays timeline may represent a different overlay being applied during a particular segment of the highlight video. A marker 533 is displayed over all a timelines to mark a current time in the video.

During clip editing, the clips timeline may be outlined or enlarged to indicate that it is currently the active timeline. Further, the block corresponding to the current clip being edited may be highlighted or filled using a different color to indicate that it is the current clip being edited.

The multi-purpose command list also includes clip editing options applicable to clip editing. For example, in the embodiment as illustrated in FIG. 5, the available options displayed in the multi-purpose command list include such clip editing options as "insert clip," "move clip," and "restore clip." A scroll bar 537 indicates that more clip editing options are available. Navigation through the timelines and the multi-purpose command list are both controlled by specific predefined user inputs in the video game controller. For example, toggling through the timelines may be performed by displacing a multi-axis analog control stick to either the left or the right, where greater deflection results in faster toggling across the timeline. The mapping of user inputs during clip editing is displayed in the input legend at the bottom of the video editor when clip editing is active.

For example, if the "insert clip" option is selected from the multi-purpose command list, the processor of the video game console may modify the multi-purpose command list to display a list of available game play footage video clips for selection. In some embodiments, a video clip preview is displayed on the viewport when the title of the video clip is highlighted in the multi-purpose command list. In some embodiments, an additional option may allow for a full screen preview of video clips.

Figure 6:
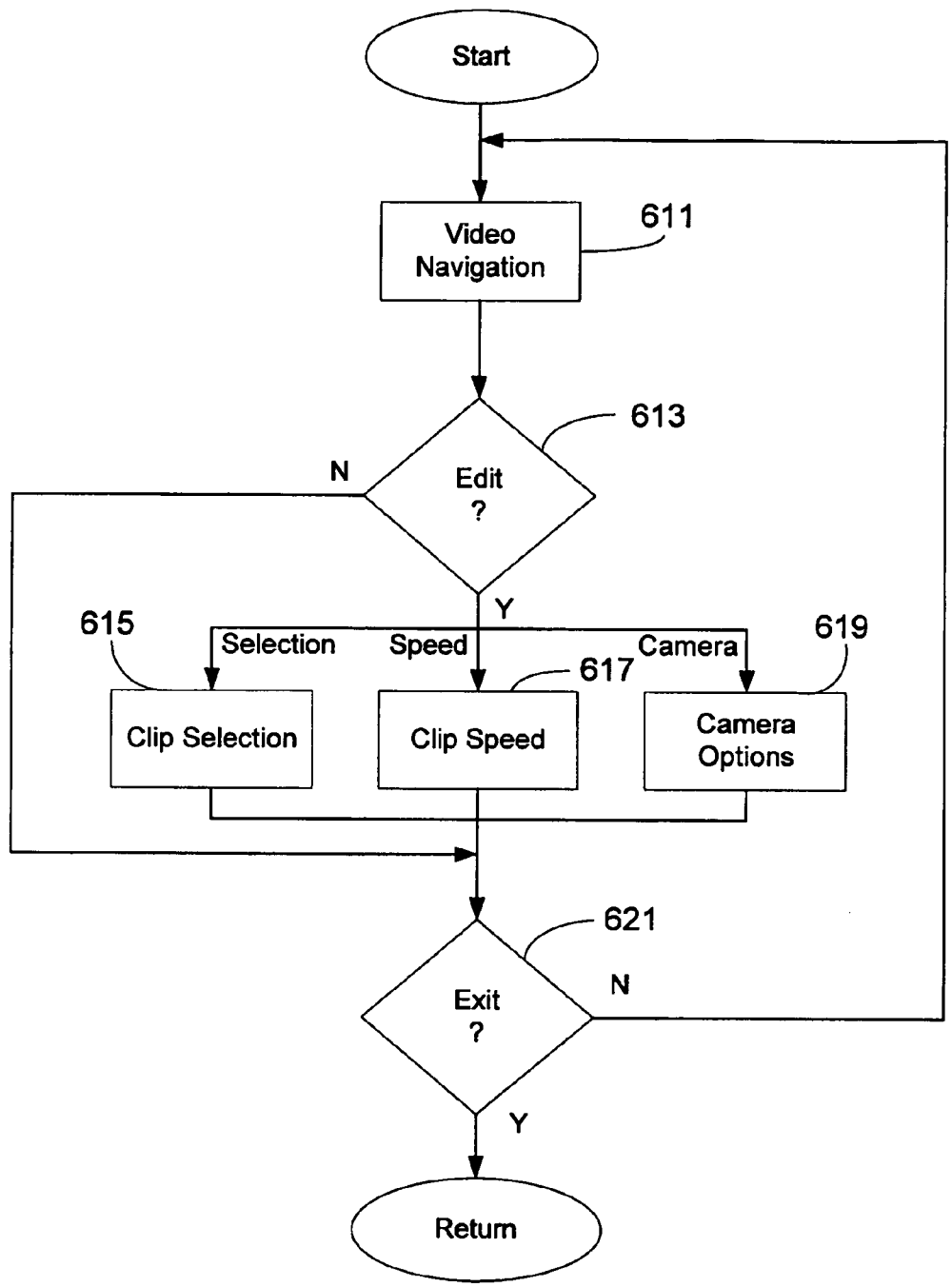
FIG. 6 is a flow diagram of a video clip editing process in accordance with aspects of the invention.

FIG. 6 is a flow diagram of a video clip editing process in accordance with aspects of the invention. In some embodiments, the process may be performed in the context of a video editor in a video game, for example, a skateboarding video game, and may be performed by a video game console or a processor, for example of a video game console, configured by program instructions. In some embodiments, the process may be performed as part of block 415 of the process of FIG. 4, and feature an user interface similar to the interface as described with respect to FIG. 5.

In block 611, the process provides video navigation functions. In most embodiments, a processor in a video game console receives and processes user inputs to navigate through video clips of an audiovisual presentation. The process allows users to access any portion of the highlight video in order to, for example, make specific edits to particular portions of the highlight video. The process may also include playback options such as, for example, fast forward, rewind, pause, stop, and scene selection. In some embodiments, navigating through the highlight video may be accomplished by, for example, deflection of a multi-axis analog control stick on the video game controller, and the portion of the highlight video being edited may be indicated by, for example, the timeline marker 533 as illustrated in FIG. 5. In other embodiments, depressions of pre-defined buttons or triggers may indicate different video navigation functions, such as for example, play, pause, fast forward, rewind, stop, or exit.

In block 613 the process determines which video clip editing options to activate. The determination may be based on specific user inputs. As illustrated in FIG. 6, the options include clip selection related options, clip speed related options, and camera related options. In various embodiments fewer, additional, or different options may be provided. If no editing is performed, the process proceeds to block 621, where the process may determine to return to block 611, or to exit and return.

If the process determines that a clip selection option has been selected the process proceeds to block 615. In block 615, the process provides video clip selection options. Video clip selection allows for selection of a video clip for insertion into an audiovisual presentation. Video clip selection may also allow for removal of particular clips from an existing audiovisual presentation. In some embodiments, the process may provide additional options, for example, chopping, cutting, or selecting desired portions of a particular video clip. In some embodiments, a video clip may also be moved with respect to other video clips. Once video clip selection for a particular segment is completed, the process may exit the clip editing process or return to block 611.

If the process determines in block 613 that a clip speed option has been selected the process proceeds to block 617. In block 617 the process provides for video clip speed modification. In some embodiments, video clip speed editing provides options for speeding up or slowing down of a selected video clip or, in some embodiments particular portions of a video clip. The video speed-up and/or slow-down options may include speed changes of many different magnitudes. For example, the process may allow for the speeding up of video clip playback speed to twice, three times, or four times the original speed. Alternatively, the process may allow for the slowing down of video clip play back speed to half, one-third, or one-fourth of the original speed. Thus, for example, in the context of a skateboarding video game, slow motion effects may be incorporated to emphasize or showcase successful execution of particularly impressive tricks. In some embodiments, speed-up and slow-down rates may include more than the rates enumerated above. For example, in some embodiments speed of playback of each video clip may be controlled and edited through, for example, inputs using the multi-axis analog control sticks on the video game controller. In such embodiments, the magnitude of the analog control stick displacement may control the speed at which video clip is played. When clip speed editing of a particular portion of the highlight video has been completed, the process may exit video clip editing, or return to block 611.

If the process determines in block 613 that a camera option has been selected the process proceeds to block 619. In block 619 the process provides different camera options. In some embodiments, the process provides for a variety of different virtual video cameras to select from, such as, for example, a user held camcorder, a tripod mounted camera, a helicopter camera, or a camera mounted on a simulated camera dolly or vehicle continually following the simulated skateboarder or the skateboarder's board. In some embodiments, users are provided more interactive camera controls, and may continuously operate the views, angles, and controls of the simulated camera throughout the audiovisual feature. Camera views may be moved and positioned anywhere in the virtual world, including midair. Further, some embodiments may provide adjustment controls for rapid panning between different fields of view, as well as for racking focus, or quickly shifting the lens focus from one subject in a camera view to another. The wide variety of camera options allows users to user their creativity in generating original and innovative audiovisual features. In some embodiments, more or less virtual video camera types are available for selection and implementation. The processor determines the camera options to apply based on user inputs from, for example, a video game controller in communication with the video game console. In some embodiments, the angles and perspectives of the simulated cameras may also be adjustable, allowing for a variety of different views of the same game play footage.

In some embodiments, the process allows for interactive panning views around the simulated skateboarder at different times in the video clip. The process may also allow for adjustments to the zoom or magnification properties on the simulated cameras at different points of the game play footage. For example, close-ups may be desired when a particular trick is being performed, or a wide zoom may be desired to capture a panoramic view of the simulated skateboarder and his surroundings. Thus, the process may provide the option of controlling the zoom or magnification options throughout the game play footage via, for example, specific pre-defined user inputs into the video game controller. When editing the camera options of a particular portion of the user's highlight video has been completed, the process either exits the video clip editing process, or returns to block 611.

In block 621 the process provides the option of continuing the video clip editing process or of exiting. The processor determines whether to continue video clip editing by processing specific user inputs from, for example, the video game controller. If the user elects to continue video clip editing, the process returns to block 611. If the user elects to exit video clip editing, the process returns.

Figure 7:
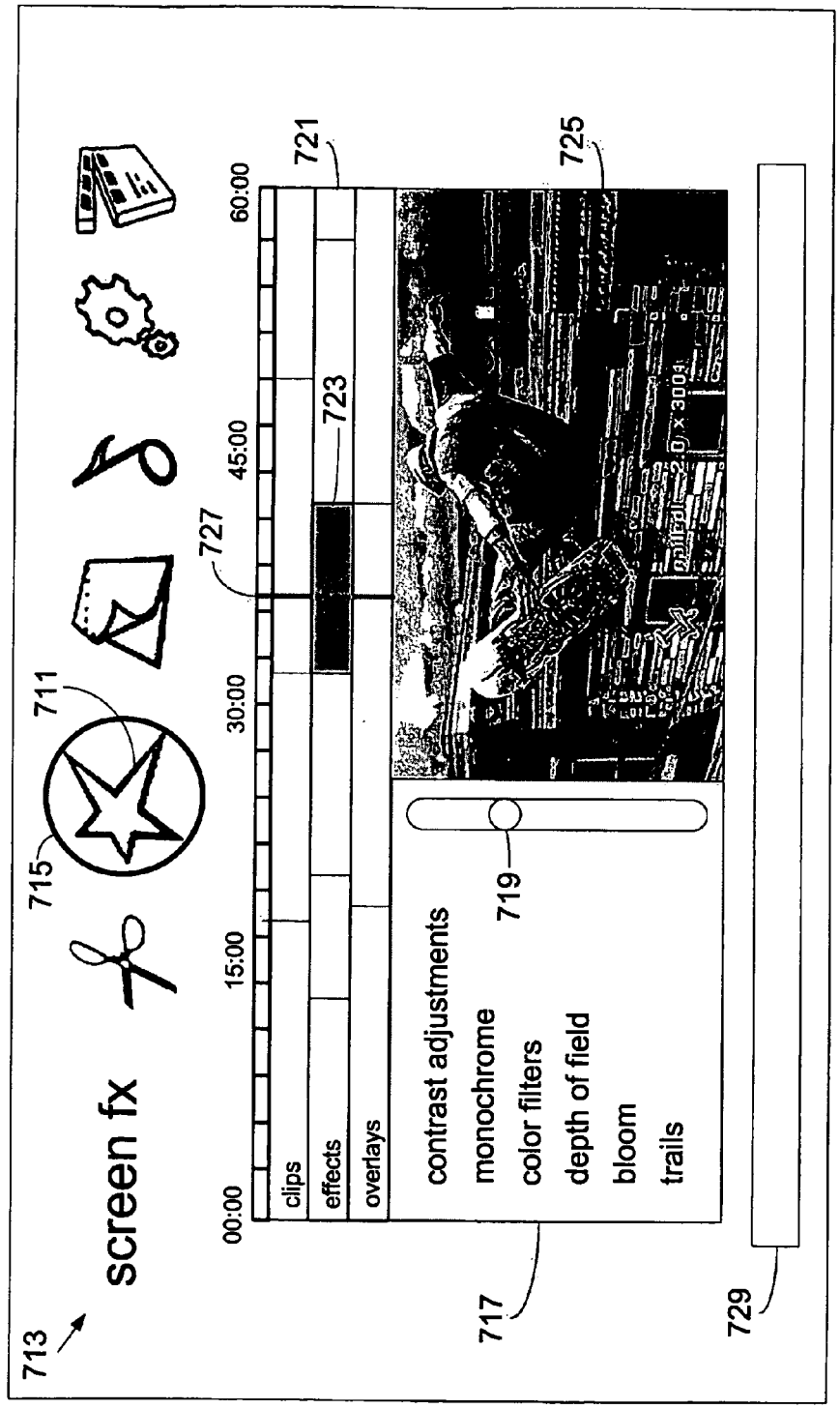
FIG. 7 is a screenshot of a video overlays and effects editing screen in accordance with aspects of the invention.

In some embodiments, video effects may be added to the video clips to enhance the appearance of the video clips. Video effects may be added to incorporate more originality, variety, or artistic flair into the highlight videos. FIG. 7 is a model screenshot of a video effects editing screen in accordance with aspects of the invention. An effects editing icon 711 at a top of the screen is circled, indicating that the screenshot shows a video effects editing display, which is also included by a screen fix label also about the top of the screen. A multi-purpose command list 717 displays a list of different effects options and sub-options. If more effects options are available than can be shown in the multi-purpose command list, a scroll bar 719 can be used to scroll through all the available options. As shown in the embodiment of FIG. 7, effects options may include "contrast adjustments," "color filters," and "depth of field," among others.

A video effects timeline 721 may also be outlined or highlighted, and the exact effect being applied delineated by a different colored or toned block 723 on the video effects timeline, so that the portion of the highlight video which edits are being applied to may be more easily and more precisely identified. A preview of the highlight video with the applied effects may be displayed in the viewport 725, and different portions of the highlight video may be selected and edited by scrolling the timeline marker 727 across all the respective timelines using a toggle option, for example, through deflection of a multi-axis analog control stick to the left or to the right on the video game controller. The input legend 729 at the bottom of the video editor is modified to serve as a key for controlling the different aspects of the video editor during effects editing.

A desired effect option may be highlighted or for example in response to a user input provided by a video game controller, and for example, depression of the digital directional pad or one of the multi-axis analog control sticks.

In some embodiments, video overlays may also be added to the video clips. Overlay editing features are activated by selection of the overlay editing icon discussed with respect to FIG. 5 and also appearing in FIGS. 7 and 8. The overlay editing icon can be selected via specific user inputs in the video game controller, typically similar to the inputs used to select the clip editing icon or the effects editing icon discussed with respect to FIG. 5.

Figure 8:
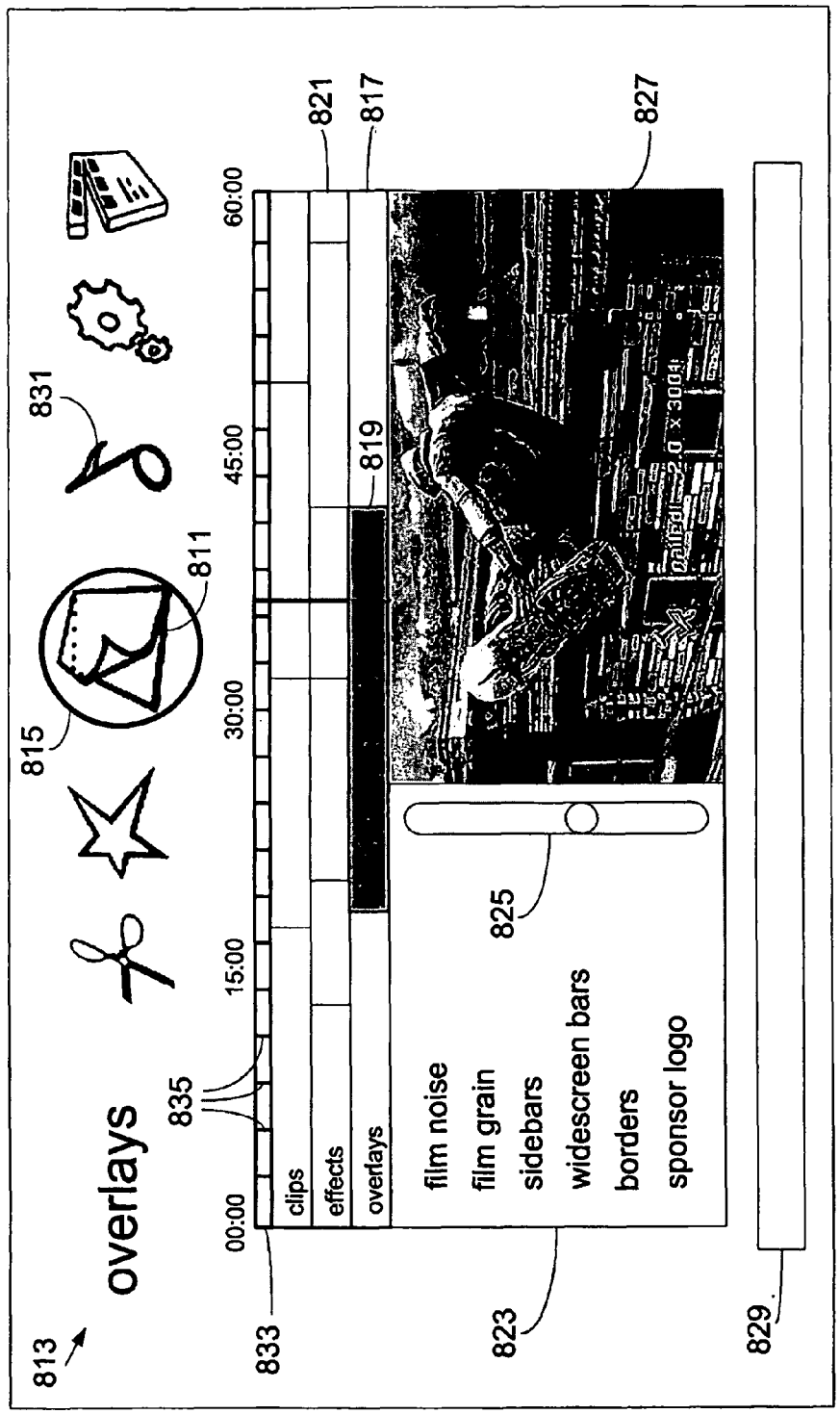
FIG. 8 is a screenshot of a video overlay editing screen in accordance with aspects of the invention.

FIG. 8 is a screenshot of an overlay editing screen in accordance with aspects of the invention. In FIG. 8, "Overlays" 813 is displayed at the top left of the screen and the video overlay icon is circled 815, indicating the screen is for overlay edits.

As with FIGS. 5 and 7, the screenshot includes a number of selectable icons across the top of the screen. The screen also includes a timeline including a clips portion, an effects portion, and an overlays portion. The screen also includes a multi-purpose command list 823 and a viewport 827. An input legend 829 at the bottom of the video editor serves as a key for navigating the editing interface using the video game controller during the overlay editing.

The video overlay timeline 817 may be outlined or otherwise more prominently displayed at the top of the main editing interface, and the block 819 corresponding to the actual video overlay being edited may be shaded a different color or tone for easy identification of the portion of the highlight video and the video overlay being edited. In some embodiments, the video overlay timeline may coincide with or be combined with the camera effects timeline 821 into one comprehensive timeline. During overlay editing the multi-purpose command list 823 displays a list of the different types of video overlays available for use and application to the highlight video. Options may include a variety of overlay choices, for example, "film grain," "widescreen bars," or "sponsor logos." If more overlay options are available than can be displayed in the multi-purpose command list, a scroll bar 825 is provided for scrolling through the complete list of overlay options. Previews of the highlight video with applied overlay options may be viewed in the viewport 827.

Figure 9:
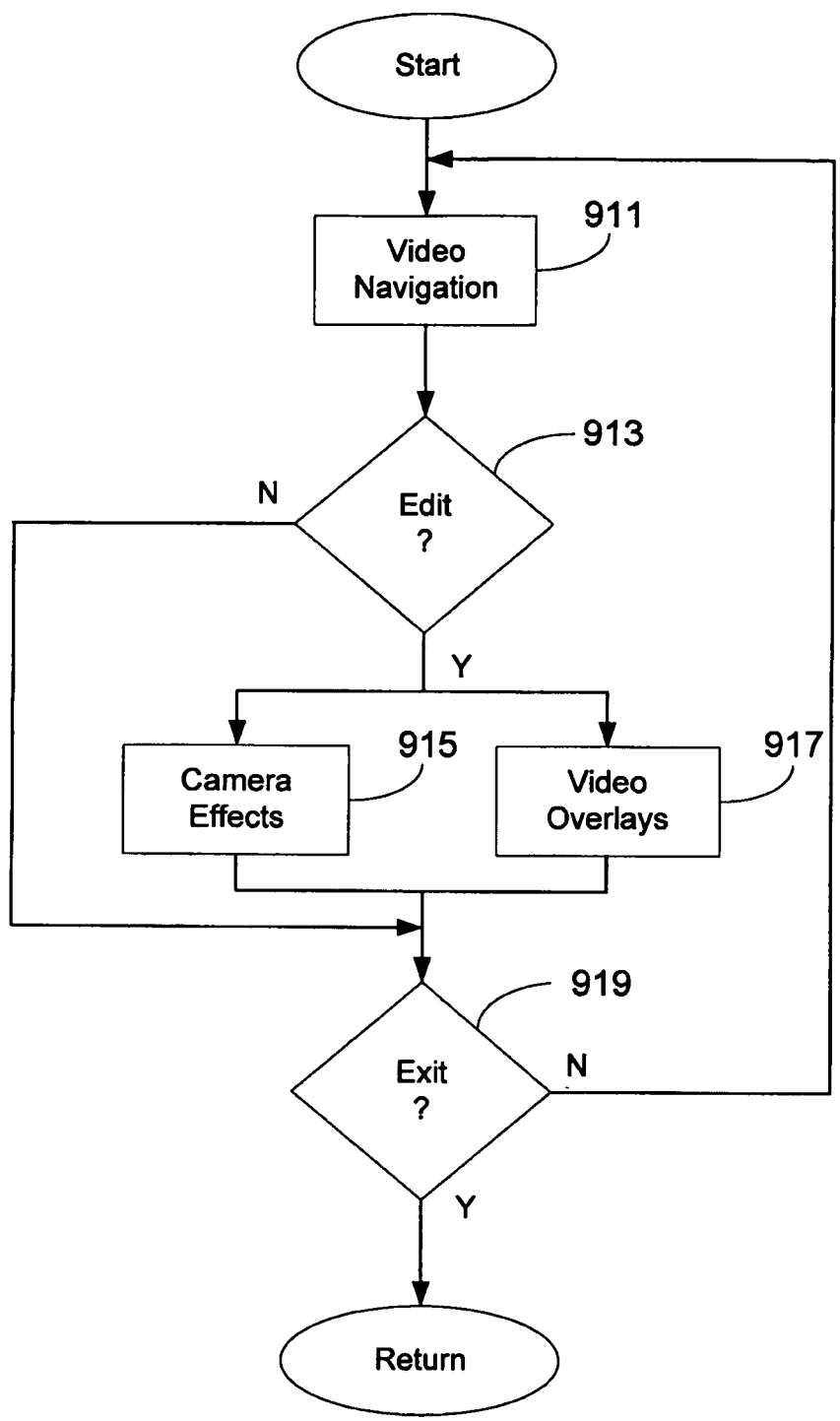
FIG. 9 is a flow diagram of the video effects editing process in accordance with aspects of the invention.

FIG. 9 is a flow diagram of a video effects editing process in accordance with aspects of the invention. In some embodiments, the video effects editing process performed as part of block 417 of the process of FIG. 4. In some embodiments the process is performed by a processor configured by a program instructions, and in some embodiments the process is performed by a video game console, for example such as described with respect to FIG. 1. In block 911, the process provides video navigation functions. In most embodiments processor in a video game console processes inputs from a user and determines how to navigate through video clips of an audiovisual presentation based on the user inputs, and selects a portion of the highlight video for editing purposes. The process may select which portion of a highlight video to navigate to based on, for example, receiving and processing inputs from multi-axis analog control sticks on a video game controller. The processor may consequently send display information to the display unit modifying the position of a timeline marker to reflect the current portion of the highlight video being edited. The selected portion of the highlight video may additionally be displayed in the viewport during the video navigation process. The video navigation process may alternatively serve as a video preview interface, where the processor allows for simple playback options of working copies of highlight videos.

In block 913, the process determines which type of video editing options to activate. The process may provide the option of activating either camera effects options or video overlay options. In some embodiments, a processor in the video game console processes inputs to determine which set of options to activate and make available. If no set of options is activated the process proceeds to exit block 919.

If the process determines to activate camera effects options, the process proceeds to block 915. In block 915, the process provides camera effects editing options. During camera effects editing, the process provides for application of a variety of different simulated camera effects to different segments of the audiovisual presentation. In some embodiments, the camera effects available may include different simulated lens views, such as fish-eye lens views or wide angle lens views. In some embodiments, the camera effects available may include contrast adjustments and stained, monochrome, or color filtered lenses to apply to the game play footage. Other camera effects may include image blurring to enhance reality, image contrast adjustments, light bloom, depth of field enhancements, trails, or other types of camera effects which are known in the field. In some embodiments, more or fewer camera effects may be available for users to apply to their highlight videos. In some embodiments, camera effects options may also comprise different types of fading or cut-in and cut-out effects. In some embodiments, the process provides for options to adjust the strength of the applied camera effects. Once an effect has been selected and applied, the applied effect may be represented as a block on the effects editing timeline covering the duration of the application of the particular effect. Similar blocks representing different applied overlays may be displayed on the overlay editing timeline as each new overlay is applied to a highlight video. When application of the camera effects for a particular section of the highlight video has been completed, the process may exit the video effects editing process, or return to the video navigation process of block 911.

If the process determines to activate video overlay options in block 913, then the process proceeds to block 917. In block 917, the process provides video overlay editing options. In the embodiment as illustrated in FIG. 9, video overlay editing is a sub-category of the video effects editing process. In other embodiments, video overlay editing may constitute its own process. Video overlay editing includes overlay options which create layers fully or partially overlapping the existing highlight video. The overlapping layers may be either static or dynamic. Examples of video overlay options may include dynamic film noise or film grain, to simulate reality or enhance characteristics of amateur filmmaking. Some embodiments of the invention may also include options to incorporate different distress levels to the highlight video. In some embodiments, the process may provide other video overlay options to choose from, such as different types of borders, for example, side bars, widescreen bars, corners, or simulated film reel borders. In addition, some embodiments may allow for insertion of logos of real sponsors, or custom made logos, onto portions of the screen. In some embodiments, more or fewer camera overlays may be available. After application of overlays to a particular portion of the highlight video has been completed, the process may return to video navigation block 911 for selection of a different portion of the highlight video to edit, or the process may exit.

In block 919, the process presents the option of either re-entering effects editing or overlay editing, or of exiting the process and returning. If further editing is desired, the process returns to video navigation block 911, otherwise the process exits.

Figure 10:
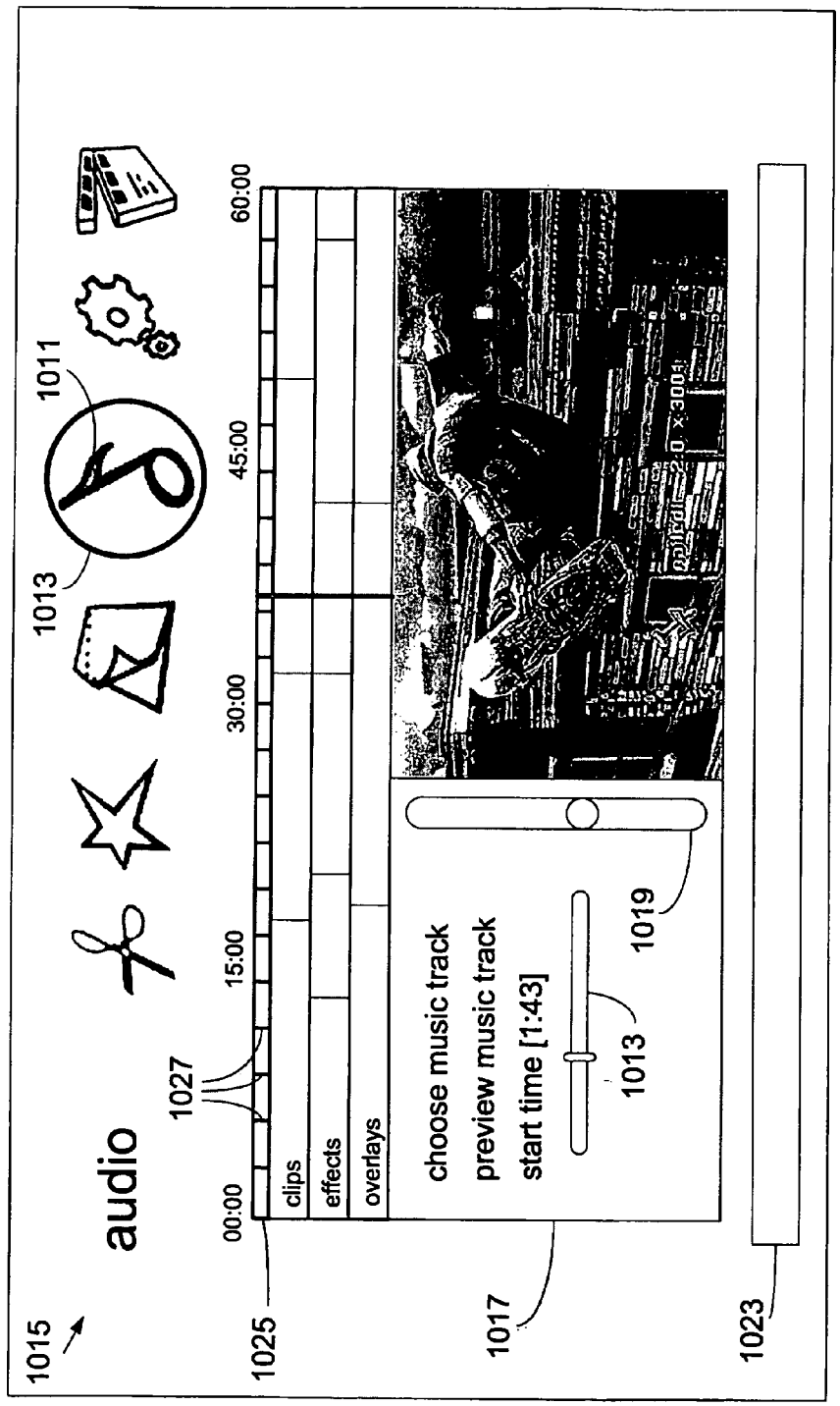
FIG. 10 is a screenshot of a video music editing screen in accordance with aspects of the invention.

In most embodiments, background music may also be incorporated into audiovisual presentations. FIG. 10 is a screenshot of a video editing screen during music editing in accordance with aspects of the invention. Music editing is generally activated via selection of the music editing icon 1011 at the top of the video editor. If music editing is selected, the music editing icon above the main editing interface may be circled 1013, and an "audio" title 1015, or similar descriptor, may be displayed at the top left of the screen. In some embodiments, a list of music files available for selection is preloaded into the memory of the external memory source, for example, a CD-ROM also holding software instructions for the proper execution of the video game. A list of music editing options and sub-options, such as available music files, may appear in the multi-purpose command list 1017. If more music editing options are available than can be displayed on the multi-purpose command list, a scroll bar 1019 may be available for access to the entire list of options. In the embodiment illustrated in FIG. 10, a sub-option scroll 1021 appears under the option "start time" for specifying where to start the music track when the audiovisual presentation begins. The input legend 1023 at the bottom of the screen is adjusted to reflect the functions performed by each input on the video game controller during music editing.

In some embodiments, aspects of the music, such as for example, which music segments to play and when during the highlight videos to play each music segment, may be adjustable. In some embodiments, preloaded music may be "beatmapped," with timing of beats in the music identified and generally stored. Recognition as to one use of beatmapped music is to allow for compression of timing of events in associated video clips, for example trick start times or track end times, with timing of beats in the music being played in the background. Beatmapped music files may be utilized, for example, if scores are associated with the construction of the audiovisual presentations. In some embodiments, a separate timeline is associated with the music file or files, to ease navigation and editing of certain portions of the music in relation to the rest of the highlight reel or music video. The music timeline may also display, for example, markers representing the beats of the music in accordance with the beatmapped music file being applied, for reference when attempting to best synchronize video clips or application of effects with the beats of the selected background music. In other embodiments, such as the embodiment as pictured in FIG. 10, a separate music timeline may not be incorporated into the video editor, and markers for beatmapped music files may appear directly on the time reference index 1025, such as for example, beat marks 1027. In other embodiments, users may be provided the option of uploading their own music files to enhance the highlight videos. In such embodiments, uploaded music files may not be beatmapped, and beat marks may not be properly generated or displayed on the time reference line for the music files.

Figure 11:
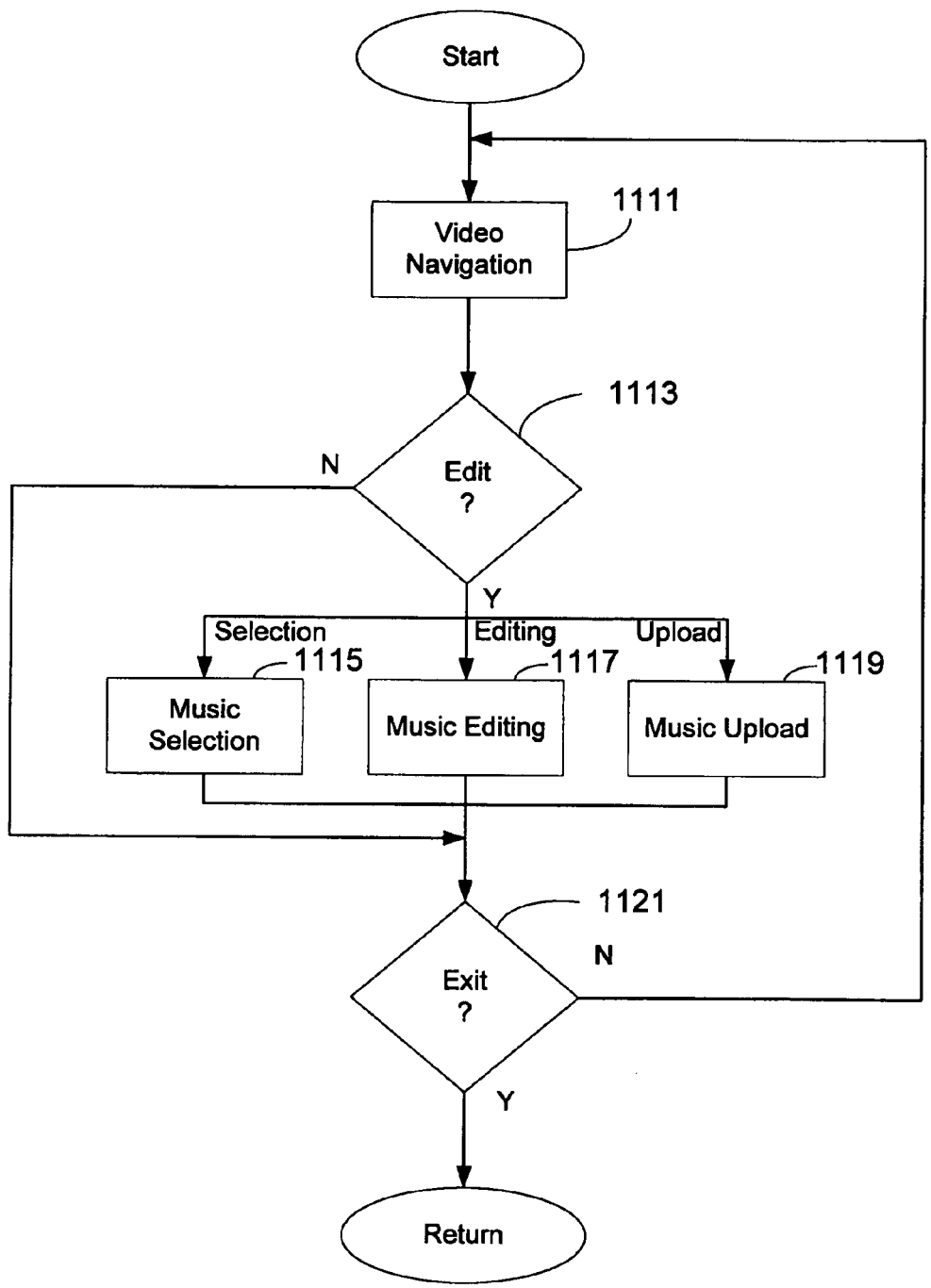
FIG. 11 is a flow diagram of a video music editing process in accordance with aspects of the invention.

FIG. 11 is a flow diagram of a music editing process in accordance with aspects of the invention. The process may be performed by a processor configured by program instructions, or by a video game console, for example as described with respect to FIG. 1. In block 1111, the process provides for video navigation. For example, a processor may receive and process user inputs in accordance with navigation through the existing highlight video and selection of a portion of the highlight video to edit. The video navigation process closely mirrors the video navigation process as described previously in both the video clip editing process of FIG. 6 and the video effects editing process of FIG. 9. In some embodiments, navigation through the highlight video during the music editing process may be achieved by accessing a dedicated music timeline in the main editing interface. In other embodiments, such as the embodiment as illustrated in FIG. 10, a music timeline may not be incorporated into the video editor.

In block 1113, the process provides different sets of options to choose from music editing. If no background music is desired or applied, the process proceeds to block 1121, where the process provides the option of exiting music editing.

If the process determines in block 1113 that music selection has been selected the process proceeds to block 1115. In block 1115 the process provides music selection options. Music selection allows for selection of the background music to accompany an audiovisual feature. During music selection, a variety of preloaded music tracks may be provided for selection, and a list of available music tracks may be listed in the multi-purpose command list. In some embodiments, the selection or highlighting of a particular music track in the multi-purpose command list may generate a preview of the music while the existing highlight video is being played in the viewport adjacent the multi-purpose command list. The selection or highlighting of another music track may prompt the video preview in the viewport to replay, with the application of the newly selected music track. In some embodiments, the process may allow for navigation through the music tracks. For example, the process may allow users to fast forward through the introduction of a music track so that the background music will start at a more substantive or exciting point in the music track when a highlight video begins. In some embodiments, the music selection options may be the only options available in the music editing process. When music selection has been completed, the process provides the option of either exiting the process or reentering video navigation and selecting a different portion of the existing highlight video to edit.

If the process determines that music editing has been selected, the process proceeds to block 1117. In some embodiments, however, music editing options are not available to users. In block 1117, the process provides music editing options. Music editing may include various music editing options to enhance the background music being applied to a highlight video. Music editing options may include, for example, selecting segments from different music tracks and applying the different segments to different portions of a highlight video. In some embodiments, music editing may involve a virtual amplifier or equalizer. In other embodiments, music editing may include a music creator, allowing for creation of original music tracks to apply to highlight videos. In other embodiments, more or less options may be made available in music editing.

If the process determines in block 1113 that music uploading has been selected then the process proceeds to block 1119. In block 1119 the process provides music uploading options. Like the music editing features of block 1117, music uploading features may not be available or may be deactivated in some embodiments of the invention. In other embodiments, the process may provide for the option of uploading music selections into audiovisual presentations. The uploaded music files may be in well recognized audio formats, such as for example, MP3, WMA, or MIDI audio files.

After any of processes 1115, 1117, or 1119 have been completed, the process continues to exit block 1121. The process determines, based on user inputs, whether to exit the music editing process, or to stay in the music editing process of FIG. 11.

Figure 12:
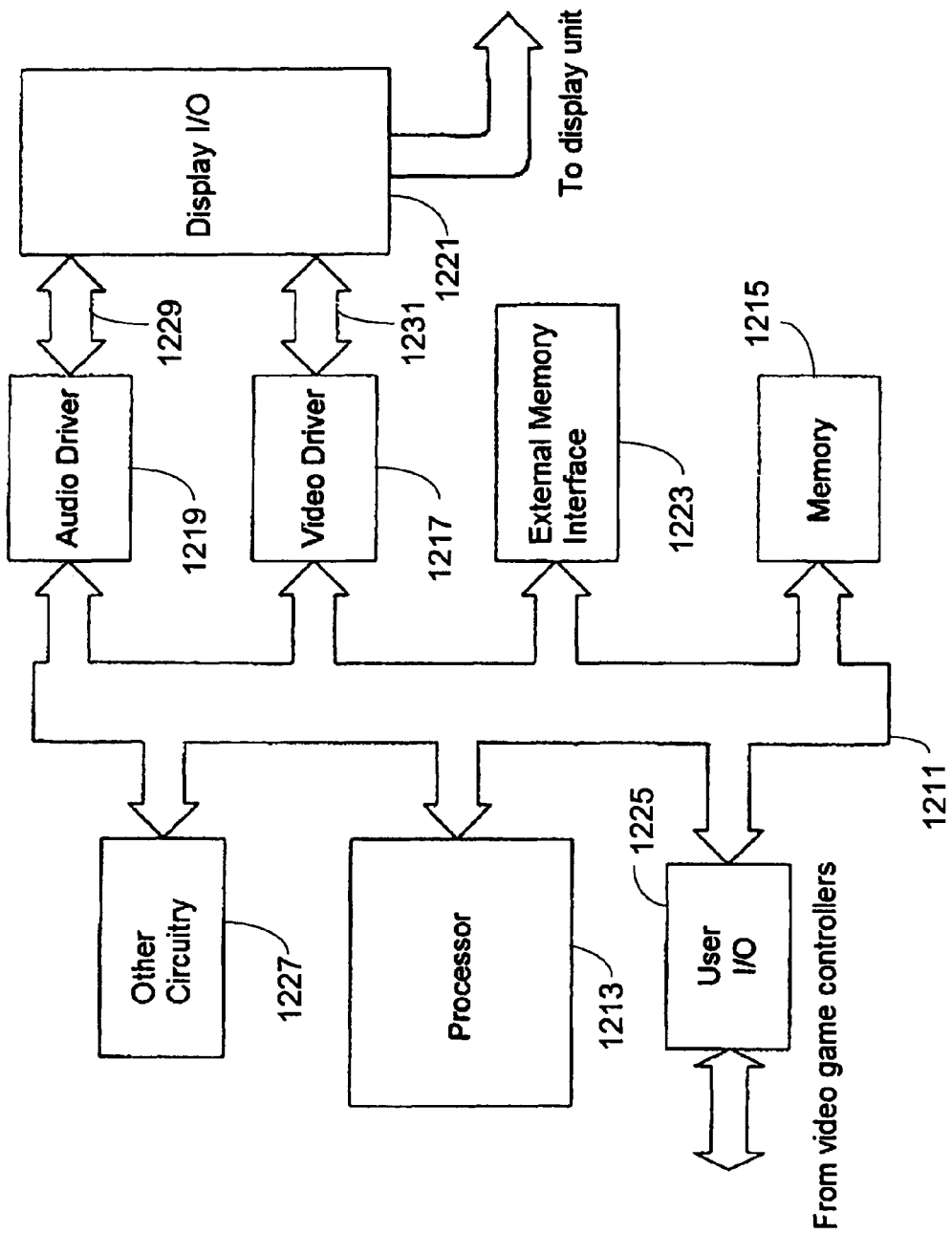
FIG. 12 is an example of a block diagram of a video game console processing unit in accordance with aspects of the invention.

FIG. 12 is an example of a block diagram of a video game console processing unit in accordance with aspects of the invention. The processing unit is comprised of a bus 1211 interconnecting a processor 1213, memory 1215, a video driver 1217, an audio driver 1219, a display input/output port 1221, external memory interface circuitry 1223, a user input/output port 1225, and other circuitry 1227. In some embodiments, there may be multiple processors utilizing multiple data buses.

The bus is configured to allow the processor access to communicate with each individual component, in order to execute software instructions in order to facilitate video game play. In operation, the processor commands retrieval of program instructions stored in the memory, executes the program instructions, and provides data for storage into the memory. The processor and other devices on the bus use the memory to store information as needed to execute video game play. In many embodiments, video game program instructions and accompanying data for specific video games are originally stored in a removable memory source, such as a CD-ROM, which communicates with the processor via the external memory interface circuitry. Specific program instructions originally stored on the removable memory source may be directly executed or transferred to the memory at the command of the processor. The program instructions may include game play instructions, information on video or audio outputs, configuration information, and instructions for processing different user inputs from a video game controller.

The processor is in data communication with the video game controller, as well as a display unit. The video game controller may provide inputs to the processing unit, and the display unit displays video game action in accordance with signals sent from the processor. The processor sends video information in accordance with video game play to the video driver, and audio information pertaining to video game play to the audio driver. The video driver provides display information pertaining to video game play to a display input/output port. In some embodiments, the audio driver may provide audio information pertaining to video game play to the same display input/output port. In some other embodiments, the audio driver may provide the audio information directly to a display with audio capabilities or other form of audio output device. In the embodiment as illustrated in FIG. 11, the video driver and audio driver are coupled to the display input/output port are shown as separate bidirectional buses 1229 and 1231. In many instances, these separate buses may be single directional buses, and the display interface may only serve as an output port. Information from this display output port may be provided to a display unit for video, and in some instances audio, generation.

Figure 13:
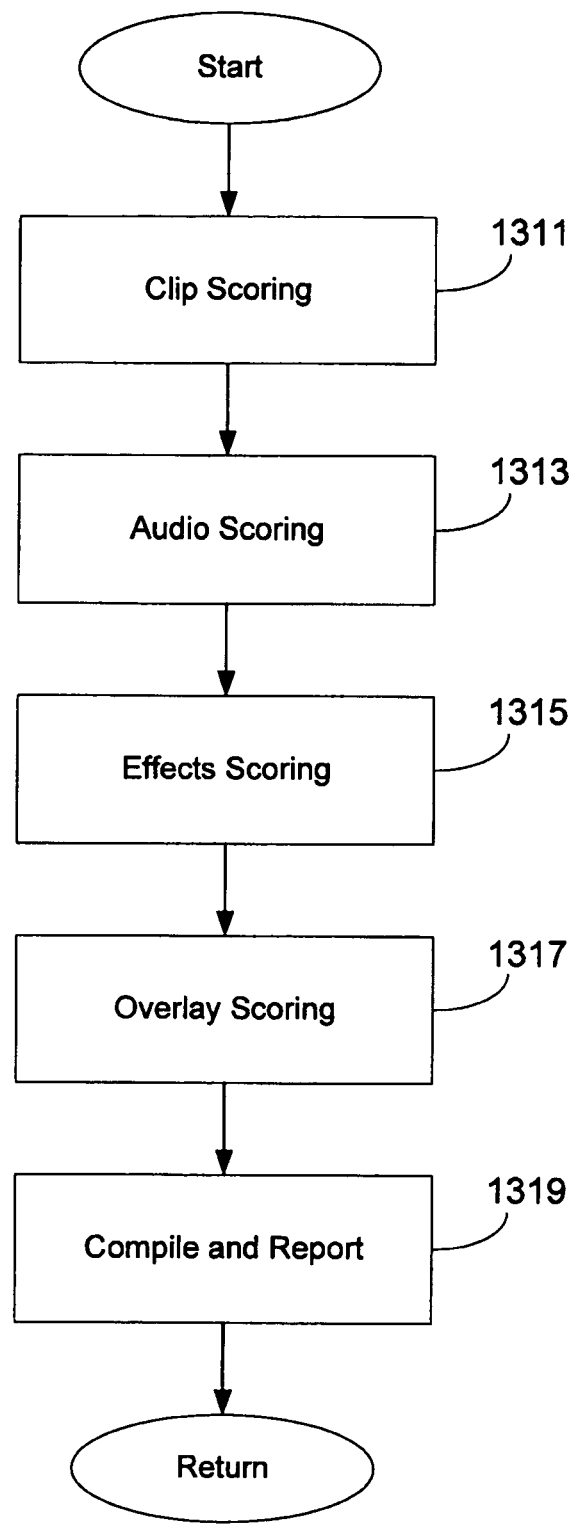
FIG. 13 is a flow chart diagram of a process of scoring audiovisual presentations in accordance with aspects of the invention.

FIG. 13 is a flow chart of an audiovisual presentation scoring process in accordance with aspects of the invention. In some embodiments the process is performed by a processor configured by program instructions, and in some embodiments the process is performed by a video game console, for example as discussed with respect to FIG. 1. The audiovisual presentation scoring process may be implemented to provide a basis of comparison for users to compare audiovisual presentations. In some embodiments, scoring calculations may be tabulated as the audiovisual presentation is played, for example, by a processor within the video game console. In other embodiments, scoring may provide for completed audiovisual presentations. In some embodiments, scoring may be tabulated while the video is being created and edited in the video editor, allowing a user to edit his highlight video and instantaneously see the impact the edit may have on the score for the highlight video. Such "real time" scoring may help users determine whether a particular edit should be kept or discarded during the video editing process.

In block 1311 the process performs clip scoring. Clip scoring applies scores to video clips in an audiovisual presentation. Scoring may be based on, for example, events that occur within each clip. In the context of a skateboarding game, clip scores may be based on, for example, tricks performed by the skateboarding character within each clip, or to, for example, landing a trick without bailing.

Score calculations performed in clip scoring are based on a point system, with for example points assigned to different events performed within a video clip. Generally, in the context of a skateboarding video game, higher scores may be awarded for, for example, more difficult tricks, or events which are, for example, harder to complete or take more time to complete. In one embodiment, a clip may be awarded, for example, 200 points for successfully completing a trick in which an airborne skateboard is caused to rotate with respect to a skateboarder character, and bonus points, for example 50 points, may be awarded for each additional trick performed while the skateboard remains airborne. A video clip may likewise be assessed points for including video clips of the skateboarding character performing different tricks, where each trick is worth a predefined point value if performed successfully, for example, 10 points for each ollie successfully performed.

Points may also be assessed for other events which may not be trick-related. For example, a video clip may be assigned points when a skateboarder character bails or falls based on the magnitude of the fall, where more points are awarded for bigger crashes, or for the simulated skateboarder running into people or causing collisions. Smaller point amounts may be awarded for easier events, for example, 2 points may be awarded for landing the skateboard successfully, and initiating a bail may be worth, for example, 200 points. The score amounts may depend on many different factors, for example, the time it takes to complete the event. A bail may be worth, for example, more than performing a successful landing, not because it is difficult to perform, but rather because points for the bail will only be awarded after the bail has completed, for example, after the skateboarder has fallen and come to a complete stop. Similarly, scores for other events may be tied into, and adjusted based on, many different factors.

In some embodiments safeguards are also implemented to prevent users from abusing the scoring system. For example, users may want to "cheese," or manipulate, scoring of video clips by, for example, replaying a high scoring video clip repeatedly, or by performing easy tricks which take minimal time to perform. Clip scoring may reduce points for, for example, too many edits within a predefined time period within the highlight video, or for, for example, overuse of the same source clips in a single audiovisual presentation. If a user realizes, for example, that an ollie earns easy points and only takes a short amount of time to complete, the user may be inclined to perform the same trick repeatedly or trim the video clip down to only the completed ollie and replay that video clip continuously, thereby earning points simply for repeating the same event or video clip over and over again. If "cheese-fighting," or a safeguarding against manipulation of video clip scoring is implemented, a video may lose points for, for example, performing too many events in a particular timeframe, for example, more than two ollies per second, thereby defeating the incentive to cheese. If a particular video clip earns many more points than other video clips, a user may be inclined to replay that clip rather than spend the time to create new video clips which will likely earn less points. Cheese-fighting may deduct points for using a video clip too many times in the highlight video. Use of a particular video clip may be limited to application only a certain number of times, for example, 1.5 times. Therefore, in this example, if a video clip is used once in a highlight video, only half of the same video clip may be applied in a different portion of the highlight video, and use of the video clip more than the 1.5 times may result in point deductions. Therefore, while repeat applications of the same video clip may be allowed in moderation, for example, to highlight or emphasize a particular event, excessively repeated replays to garner higher scores are thus prevented.

In some embodiments, additional points may be awarded for, for example, changing the speed of clips, or for example, simply trimming clips. These additional points may be added into the scoring system simply to encourage the use of the different editing features in the video editor. Likewise, points may be reduced if too much speed edits or trimming is applied, to prevent the abuse of these additional point earning methods.

In block 1313 the process performs audio scoring. Audio scoring may make use of, for example, beatmaps in an audio track part of the audiovisual presentation. In other embodiments a score may be applied for general application of an audio clip or music file, or alternatively, the scoring process may bypass audio scoring and award no points for audio.

In embodiments with beatmapped audio tracks, scoring may be increased for, for example, aligning video clip events with beats in the selected audio track. Scores may be assessed based on the correlation between events in the video clips and the beats of the audio track or tracks used, and scores may be earned when events are performed within a certain threshold of the beats of the audio track. Audiovisual presentations may be awarded higher scores when, for example, events in the video clips correlate exactly in time with the beats in the audio tracks, and the possible scores earned may be reduced as a function of the time gap or phase discrepancy between an event and a beat in the audio track. In addition, points awarded for events may be multiplied if performed on a beat in the audio track. For example, ollies or lands performed on beat may be awarded, for example, a multiplier of two. Alternatively, in some embodiments, points may be deducted for performing tricks which are outside a predefined threshold of the beats of the audio track. In some embodiments, markers on displayed timelines in the main editing interface corresponding to beats in the audio track or music file may be provided, to assist in successful alignment of events with beats in the audio tracks of the highlight video. In this fashion, a simple reference is provided to help in editing highlight videos, in an effort to most accurately synchronize video clip events with the beats in the background music.

Cheesefighting may also be applied to audio scoring in the scoring process. Points may be deducted, for example, for insertion of too many extra clip events in between audio beats. This may be to prevent, for example, repetitive trick or event insertion around the vicinity of a beat in the audio track to try and catch perfect synchronization and earn the audio points for that particular beat marker. Such a configuration may also prevent, for example, inserting as many tricks as possible in between beats in the audio tracks just to garner extra points.

In block 1315 the process performs effects scoring. In some embodiments, effects may last for a fixed duration of time, and applying a particular effect may increase the score by a predefined amount. All effects may be worth the same point amount, or alternatively, different effects may yield different point amounts. In some of these embodiments, the scores for each effect may be dependent on multiple factors, such as for example, adjusting the strengths of the effects used, using hard-ins and hard-outs on the effects, or the application of expensive unlockable effects. In other embodiments, effects might be applied for a variable duration, and scores may be based in part upon the duration of the application of the effect. Multiple effects may also be combined during any segment of the highlight video, with up to 3 effects being applied at any particular time.

While applying effects to highlight videos is desired to an extent, applying too many effects may clutter the appearance of a highlight video. Scoring safeguards may be implemented, which may discourage the overuse of effects. For example, a ceiling may be set for earning points on combined effects in the highlight video. Scoring may not be applied for combined effects past a certain limit. For example, if the limit is set as 75%, only 75% of the highlight video will be eligible for earning points for combined effects, and any multiple effect usage over the 75% limit may not garner any additional points. As with clip scoring and audio scoring, cheesefighting may also be applied to effects scoring to prevent the excessive combination of three effects throughout the highlight video to maximize scores. A safeguard may be implemented corresponding to the amount of applied effects considered to be within a reasonable or sensible limit. In such an implementation, the total effects limit may be set at, for example, a value of 1. In this example, the limit of 1 would correspond to allowing the application of the equivalent of one single effect throughout the duration of the highlight video. If, for example, the limit is set at 1, application of two combined effects for half the video and no effects for the rest of the video would fall within the limit. Similarly, application of 3 combined effects for 1/3 of the video, with no effects for the rest of the video, would fall within the limit as well. Any effects usage over the predefined limit would begin to incur penalties on effects scoring.

In block 1317 the process performs overlay scoring. Overlay scoring is configured much like effects scoring, and therefore shares the same characteristics as effects scoring, as was described above with relation to block 1315. Like effects, a standard score may be given for all overlay usage, or the scoring may depend on factors such as, for example, duration of the overlay, or for example, use of overlays which were expensive or difficult to unlock.

In some embodiments, only one overlay may be allowed at any given time. In other embodiments, overlays may be combined, so that multiple overlays are simultaneously applied to the highlight video. In those embodiments which allow overlay combining, overlay scoring may also incorporate safeguards to discourage the overuse of multiple overlays and the cluttering up of the highlight video. As with effects usage, there may be a ceiling imposed for earning points on combined overlays in the highlight video. For example, if the maximum overlay combination percentage is 30%, points may be awarded on multiple overlays for a maximum of 30% of the highlight video. Thereafter, points may not be awarded for the application of multiple overlays. And as with effects scoring in block 1315, there may be a "sensible limit" value applied to the overlay scoring process. If the sensible limit value is set at, for example, 0.5, the use of, for example, a single overlay for 50% of the highlight video, or for example, two overlays for 25% of the highlight video, or any combination of the two, would fall within a 0.5 sensible limit value. Any overlay usage above this sensible limit value may not be awarded points, and may incur additional scoring penalties. In such a manner, application of too many overlays to highlight videos may be discouraged. In some embodiments, a joint sensible limit value may be set in addition to, or in lieu of, the effects limit and the overlay limit, and may represent the sensible limit of the usage of the combination of both effects and overlays in a highlight video.

In block 1319, the process compiles scores from clip scoring, audio scoring, effects scoring, and overlay scoring for the highlight video, and may provide for display of the total score on a display unit. The displayed score may be in the form of, for example, a single combined score, or may also include, for example, a breakdown of the point calculations for all four scoring categories. In some embodiments, a scoring breakdown for each scoring category may also include deductions for repetition or cheese. After a score is presented, the process returns.

Figure 14:
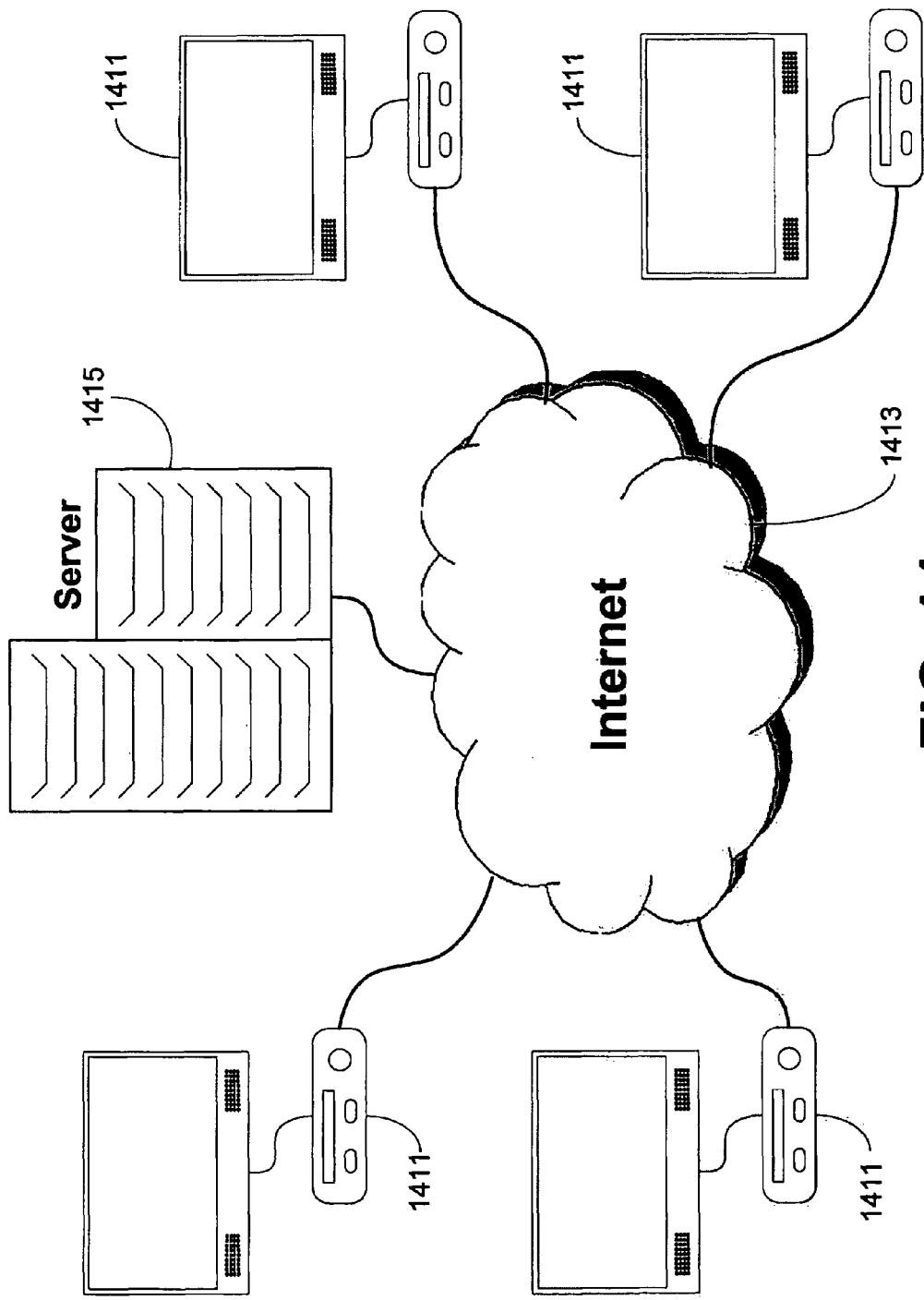
FIG. 14 is a block diagram of a network model representing the uploading of highlight videos via the Internet for sharing purposes in accordance with aspects of the invention.

FIG. 14 is a block diagram of a system which allows for uploading of audiovisual presentations onto the Internet.

Audiovisual presentations may be uploaded onto servers available over the Internet to allow for sharing of presentations, for example. For example, an audiovisual presentation may be saved onto a memory of the video game console on which the highlight video was created. At any given moment, a plurality of video game consoles 1411 may be active and are playing a particular video game, for example a skateboarding video game. The video game consoles running the particular video game may provide the option of interconnecting with each other through an Internet connection 1413. An Internet connection may be desired if, for example, the video game being played has an option to connect multiple players over the Internet for multiplayer game play, or for example, for uploading and sharing of different types of files associated with the particular video game. In some embodiments, some video game consoles may connect and communicate with other video game consoles via the Internet wirelessly.

In the context of the video game video editor, users are given the option of sharing their audiovisual presentations with other users of the video game. In some embodiments, sharing may be peer-to-peer, where a first video game console connects with a second video game console, and the audiovisual presentation is sent directly from the first video game console to the second video game console. In other embodiments, an upload option may be selected in the main editing interface, initiating the transmission of the audiovisual presentation through the Internet to a server 1415. In some of these embodiments, upload options may be restricted for audiovisual presentations which meet certain criteria, for example, if an audiovisual presentation scores higher than a minimum score. The server may have memory space dedicated to storage of these audiovisual presentations. The server may be a server dedicated to storage of files related to a particular video game, or the server may be a server used to store multiple file types associated with a plurality of different video games. In the embodiments where user highlight videos are transmitted and stored in the server, the associated data may include data pertaining to the simulated skateboarder, bone animation data, effects, overlays, and applied music, as well as modifications to the simulated world. Using this information, the server recreates the audiovisual presentation upon a request to view the highlight video.

In embodiments with a server, once audiovisual presentations are uploaded to the server, the audiovisual presentations may be arranged in a variety of different formats. In some embodiments, videos may be listed in order according to high scores, for example, a leaderboard format. In other embodiments, videos may be arranged in different orders or categories, such as for example, most recently updated videos, most accessed or viewed videos, or videos from different geographic areas. Other video game consoles connected to the Internet may then retrieve and view uploaded audiovisual presentation. Once an audiovisual presentation is selected, the data saved pertaining to the audiovisual presentation is used to reconstruct the audiovisual presentation, and the resulting video file may be accessed and viewed on the requesting video game console. Replay of audiovisual presentations may be accomplished, for example, by streaming the video to a video game console, or for example, by transmitting the entire file including an audiovisual presentation file to the video game console before viewing of the audiovisual presentation is permitted. In some embodiments, after each highlight video has been viewed, options to rate or score the audiovisual presentation, comment on the audiovisual presentation, or otherwise supply feedback on the audiovisual presentation, may be provided. In embodiments with leaderboards, the order of the leaderboard may or may not be affected by the additional feedback.

The invention therefore provides for video editing of game play information for a video game, for example a skateboarding video game. Although the invention has been described with respect to certain embodiments, it should be recognized that the invention may be practiced other than as specifically described, the invention comprising the claims and their insubstantial variations supported by this disclosure.

What is claimed is:

1. A method of providing audiovisual presentations for a video game, comprising:
   during game play, saving game state information representative of a set of video clips, each video clip corresponding to a series of images generated during game play;
   generating a video compilation using selected video clips from the set of video clips;
   modifying the video compilation based on inputs from a video game controller; and
   adding at least some audio with the video compilation to thereby form an audiovisual presentation, the at least some audio being associated with events included in the video compilation.

2. The method of claim 1, further comprising displaying on a display an editing interface including a display of at least a portion of the audiovisual presentation.

3. The method of claim 2, wherein the editing interface further comprises one or more timelines, the one or more timelines including a time reference index indicating times in the audiovisual presentation.

4. The method of claim 2, wherein the editing interface further comprises one or more editing options to edit the audiovisual presentation, the one or more editing options selectable through inputs from the video game controller.

5. The method of claim 1, wherein the set of video clips are a set of video clips displaying a game character in interaction with an object.

6. The method of claim 5, wherein the object is a skateboard.

7. The method of claim 1, further comprising adjusting effective viewing angles of a selected video clip based on inputs from the video game controller.

8. The method of claim 1, further comprising adjusting magnification properties of a selected video clip based on inputs from the video game controller.

9. The method of claim 1, wherein modifying the video compilation includes rearranging the order of video clips in the video compilation.

10. The method of claim 1, wherein modifying the video compilation further comprises:
    adding video clips from the set of video clips to the selected video clips; and
    removing video clips from the selected video clips.

11. The method of claim 1, wherein modifying the video compilation further comprises adding simulated camera effects to the video compilation.

12. The method of claim 1, wherein modifying the video compilation further comprises adding video overlays to the video compilation.

13. The method of claim 1, wherein associating adding at least some audio with the video compilation comprises adding background music to the video compilation.

14. The method of claim 13, further comprising assigning a score to the audiovisual presentation, the score being partially based upon a relationship between timing of events in the audiovisual presentation and timing of sounds in the background music.

15. The method of claim 1, further comprising assigning a score to the audiovisual presentation.

16. The method of claim 1, further comprising sending information of the audiovisual presentation over the Internet.

17. A system for providing a video editor in a video game, comprising:
   a display;
   a video game controller;
   memory, the memory including game state information, saved during a previous game play period, the game state information being representative of a set of video clips comprising information of a skateboard character in operation of a skateboard in a simulated world; and
   a processor configured by program instructions to generate display information of the video editor, the program instructions including instructions for:
      providing video clip editing options, including an option to generate an audiovisual presentation using selected video clips from the set of video clips;
      providing video effects editing options;
      providing video overlay editing options; and
      providing music editing options, the music editing options including an option for adding background music to the audio visual presentation, the background music being synchronized with events included in the audio visual presentation.

18. The system of claim 17, wherein information of a skateboard character in operation of a skateboard includes a set of coordinates, the coordinates corresponding to the location of each bone of the skateboard character in the simulated world.

19. The system of claim 18, wherein the processor is configured by program instructions to allow modification to the display angle of a video clip from the set of video clips using the set of coordinates.

20. The system of claim 19, wherein the modifications are based on a mapping of inputs from the video game controller.

21. The system of claim 17, wherein the processor is configured by program instructions to allow modification of the audiovisual presentation with the video clip editing options, the video effects editing options, the video overlay editing options, or the music editing options.

22. The system of claim 21, wherein the video clip editing options apply a first mapping of inputs from the video game controller, the video effects editing options apply a second mapping of inputs from the video game controller, the video overly editing options apply a third mapping of inputs from the video game controller, and the music editing options apply a fourth mapping of inputs from the video game controller.

23. The system of claim 17, further comprising a video preview option, wherein the processor is configured by program instructions to display a preview of the audiovisual feature.

24. The system of claim 17, further comprising a video upload feature, wherein the processor is configured by program instructions to upload the audiovisual feature over the Internet.

25. A memory product including a non-transitory computer-readable medium storing program instructions, which when executed cause a processor to:
   during game play, save game state information representative of a set of video clips, each video clip corresponding to a series of images generated during game play;
   generate a video compilation using selected video clips from the set of video clips;
   modify the video compilation based on inputs from a video game controller; and
   adding at least some audio with the video compilation to thereby form an audiovisual presentation, the at least some audio being synchronized according to a timing of at least one event included within the video compilation.

* * * * *